May 30, 1933.  D. O. BARRETT  1,912,246
POST BEARING SUPPORT
Filed Dec. 1, 1931

WITNESSES

INVENTOR
D. O. Barrett
BY
ATTORNEYS

Patented May 30, 1933

1,912,246

UNITED STATES PATENT OFFICE

DWIGHT O. BARRETT, OF TULSA, OKLAHOMA

POST BEARING SUPPORT

Application filed December 1, 1931. Serial No. 578,381.

This invention relates to an improved post bearing support for pumping jacks or front rigs forming part of the installation for pumping crude oil and the like, the object being to provide a construction which will present a proper support and which could be adjusted in any desired direction in a horizontal plane.

Another object of the invention is to provide a post bearing adapted to be used on what is commonly known as a Samson post forming part of the rig front installation of crude oil pumps and other devices, the bearing including an adjusting structure using adjustable locking means for locking the bearing in different adjusted positions.

An additional object is to provide a post bearing wherein coacting surfaces are provided with slots, the slots in one surface being at right angles with the slots in the other surface, so that clamping screws extending through said slots may be used and yet the bearing adjusted in any direction in a horizontal plane, the movable parts of the bearing being associated with set screws or other means for locking the same against shifting after having been once set.

In the accompanying drawing:—

Referring to the accompanying drawing by numerals, 1 indicates a walking beam which may be of the usual kind, and 2 the rocking bearing casing having a shaft extending therethrough, mounted on the upstanding ears or bearing posts 3 and 4. The construction of the walking beam may be of any desired kind and also the bearing sleeve 2 and the shaft or other mechanism extending therethrough and caried by ears 3 and 4.

Figure 1:
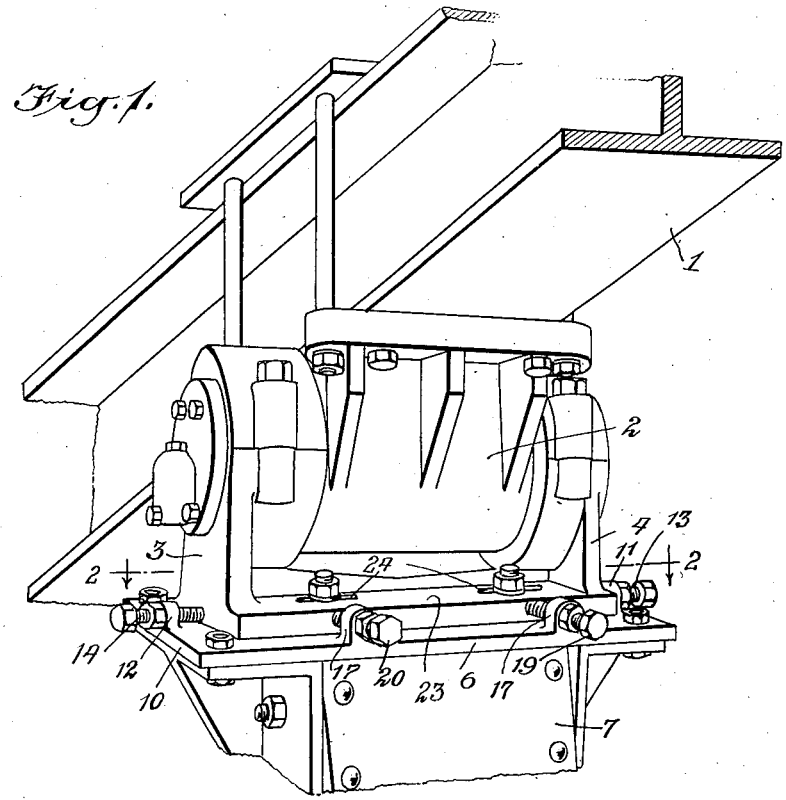
Figure 1 is a detail fragmentary perspective view of part of a Samson post and walking beam disclosing a post bearing embodying the invention.
Figure 2:
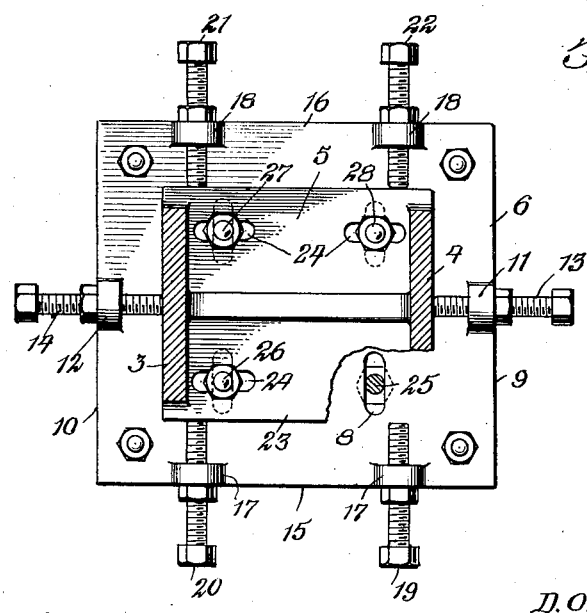
Figure 2 is a sectional view through Figure 1 on aproximately line 2—2, certain parts being broken away for better illustrating the structure.

The particular rocking bearing shown in Figure 1 is the kind used on the Samson post now being placed on the market by the Lufkin Foundry & Machine Company of Lufkin, Texas.

In pumping oil wells and for other purposes where a standard or post is used for supporting a walking beam bearing the improved bearing supports shown in the drawing may be used. These bearing supports are shown as consisting generally of a supporting plate 5 and a bearing plate 6. However, if desired, the plate 6 could be made as an integral part of the post 7 without departing from the spirit of the invention. Generally, the plate 6 is made independently and bolted, riveted, or otherwise rigidly secured to the post 7. The bearing plate 6 is provided with a plurality of slots 8, there being four shown in the drawing and all these slots are arranged parallel to the edge 9. Adjacent the edges 9 and 10 are arranged preferably integral ears 11 and 12, said ears being provided with threaded apertures through which the set screws 13 and 14 extend. Adjacent the edges 15 and 16 are integral ears 17 and 18, said ears having threaded apertures accommodating the respective set screws 19, 20, 21 and 22. These set screws are adapted to adjust or shift the position of the supporting plate 5 and to lock the same in its adjusted position. The supporting plate 5 has a base 23 fitting flatwise against the flat upper surface of plate 6 and is provided with a number of apertures 24 parallel to the edge 15, and consequently, at right angles to the edge 9. In the drawing four of these slots have been provided and said slots are so positioned as to fit over and extend across the slots 8 in the bearing plate 6. Bolts 25, 26, 27 and 28 extend through the respective pairs of slots, said bolts acting to firmly clamp the plate 5 to plate 6. Ordinarily, this would hold the parts in proper position, but sometimes, as there is great strain on these parts, the various set screws above described are used to lock the plate 5 against any shifting. In oil well pumps or in other places where walking beam 1 is used, it is very desirable to keep this beam properly aligned. Where it is properly aligned originally, the parts function properly, but if the settling of the ground should slightly shift the parts to a position out of alignment, nothing could be done where the ordinary bearing heretofore used is in operation. By the construction disclosed, after the posts 7 have been properly set and the other parts connected up, if the pump end of the beam 1 is exactly in alignment to cause the various rods and other parts of the pump to move without any side friction, the plate 5 is merely locked against movement. If the walking beam is slightly out of alignment or slightly extends forwardly too much or rearwardly too much, the bolts 25 to 28 inclusive are loosened and then the set screws are manipulated to shift the plate 5 to secure a proper alignment of the walking beam. It will be noted that the plate 5 may be shifted in a direction longitudinally of the walking beam, transversely thereof, or in any direction in a horizontal plane. In this way the walking beam may be swung around to a certain extent or moved back and forth longitudinally, or moved laterally, and in this way, the walking beam is properly aligned both with the power and with the power using element. This adjustment is adapted to be made when the parts are first installed and later if any parts wear or shift their position slightly, the new alignment being made quickly and easily so as to give a maximum service at all times.

I claim:

1. A bearing support for Samson posts comprising a horizontal bearing plate connected rigidly with the post, a supporting plate adjustably mounted on the bearing plate and acting to support a rocker bearing, means for shifting the supporting plate in any direction in a plane parallel to the surfaces of said bearing plate and locking the plate in different positions, and means for clamping the supporting plate to the bearing plate.

2. A bearing support for posts adapted to support walking beam bearings, said support including a bearing plate rigidly secured to said post, a supporting plate slidingly mounted on said bearing plate, said supporting plate being formed with means for supporting said bearing, said supporting plate being adjustable in any direction in a horizontal plane on said bearing plate, and screw means acting in a plane parallel with said bearing plate for adjusting said supporting plate and also for locking the same supporting plate against movement.

3. A bearing support for a rocker bearing carried by a post, said support including a supporting plate positioned on the post and adjustable in any direction in a horizontal plane thereon, clamping bolts for clamping said plate to said post, and set screws engaging said supporting plate for moving the supporting plate in any direction in a horizontal plane and for locking the plate in different adjusted positions.

4. A bearing support for supporting a rocker bearing on a post including a bearing plate rigidly secured to said post and provided with a plurality of slots arranged in parallel planes, a supporting plate slidingly mounted on the bearing plate, said supporting plate having a base provided with a plurality of parallel slots extending normally at right angles to the first mentioned slots and positioned to extend across the first mentioned slots, clamping bolts extending through the respective slots for clamping said base to the said bearing plate, and screws acting in a plane parallel to said bearing plate for moving said supporting plate in any direction in a plane parallel to the bearing plate and for locking said bearing plate against accidental shifting.

5. A bearing support for supporting a rock shaft on a post including a bearing plate carried by the post and provided with a plurality of slots extending in parallel vertical planes and arranged substantially in a square, a supporting plate having a base engaging said bearing plate, said base fitting flatwise against said bearing plate, said base having four slots therein extending normally at angles to the first mentioned slots and crossing the first mentioned slots, a bolt for each pair of slots extending through the respective slots for clamping said base to said bearing plate, the arrangement of said slots permitting said supporting plate to be adjusted in any direction in a horizontal plane and a plurality of locking set screws carried by said bearing plate for shifting and then locking said supporting plate in different adjusted positions.

6. A bearing support for Samson posts comprising a flat horizontally positioned bearing plate having at least four sides, said bearing plate being rigidly connected with said post and formed with at least one apertured ear on each side, said ears being threaded, a supporting plate fitting flatwise against the bearing plate and slidingly mounted thereon and acting to support a rocker bearing, and screws in said ears acting on the edge of said supporting plate and in a plane parallel to said bearing plate for shifting said supporting plate in any direction in a plane parallel to said bearing plate and locking in different positions said supporting plate, said means movably supporting the plate in a horizontal plane.

DWIGHT O. BARRETT.